US006238759B1

(12) United States Patent
Meece et al.

(10) Patent No.: US 6,238,759 B1
(45) **Date of Patent: *May 29, 2001**

(54) COATED CHARGE ROLLER

(75) Inventors: Kermit Arnold Meece; Christopher David Strack; Troy Dustin Smith Tomson, all of Lexington, KY (US)

(73) Assignee: Lexmark International, Inc., Lexington, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/318,312

(22) Filed: May 25, 1999

(51) Int. Cl.[7] .............................. B32B 5/16; B32B 25/04; B32B 25/14; G03G 15/02; G03G 16/00

(52) U.S. Cl. ....................... 428/36.9; 428/34.1; 428/34.4; 428/35.7; 428/36.91; 428/36.92; 428/323; 428/331; 428/402; 428/425.5; 428/446; 428/698; 428/906

(58) Field of Search .................................... 399/176, 357; 427/180, 181, 183, 190, 194, 202, 204; 428/34.1, 34.4, 35.7, 36.9, 36.91, 36.92, 323, 332, 357, 402, 411.1, 446, 698, 906, 331, 425.5, 451

(56) References Cited

U.S. PATENT DOCUMENTS

| | | | | |
|---|---|---|---|---|
| 5,045,891 | * | 9/1991 | Senba et al. | 355/289 |
| 5,637,391 | | 6/1997 | Claflin et al. . | |
| 5,815,777 | * | 9/1998 | Hirabayashi et al. | 399/174 |

FOREIGN PATENT DOCUMENTS

| | | | |
|---|---|---|---|
| 62164051A | * | 7/1987 | (JP) . |

* cited by examiner

*Primary Examiner*—Vivian Chen
(74) *Attorney, Agent, or Firm*—John A. Brady

(57) ABSTRACT

Rubber charge roller cores are coated with loose particulate silicon carbide. Excess powder is removed, and the rollers are used in normal operation without an additional outer layer. Consistent, long-life operation of the charge roller is realized.

7 Claims, No Drawings

COATED CHARGE ROLLER

FIELD OF THE INVENTION

This invention relates to the imaging field of electrophotography, and more specifically, relates to an improved roller for contact charging, commonly termed charge rollers.

BACKGROUND OF THE INVENTION

Charge rollers minimize the creation of ozone since they contact the surface being charged. Charge rollers normally have an outer layer different from the body of the roller to concentrate charge at the outer layer, to protect the body from deterioration during use, and, if necessary, to prevent chemical interaction between the body of the charge roller and the photosensitive surface being charged.

A typical coating of such existing charge rollers is nylon, application of which is a costly step which employs solvents which must be contained so as not to enter the environment.

Known prior art charge rollers, such as those described in U.S. Pat. No. 5,637,391 to Claflin, assigned to the same assignee to which this application is assigned, employs an economical layer of powder on the outer surface of the body or a charge roller. This is applied by simply contacting the roller with ample amount of the powder and cleaning away the excess, all at much less cost than normal dip coating or the like.

As the speed of printing operation is increased, such acrylic coated charge rollers, when baked, do not sustain sufficient late-life charging (300,000 prints). One reason is that increased speed of the machine results in decrease in contact time between the charge roller and the photoconductive drum. Another reason is contamination, which impairs charging, increases on the charge roller over life. Also, the combination of a new baked acrylic coated charge roller with lower-melting temperature toner used in higher speed printers can result in slight over charging at the beginning of life of the charge roller. This results in unacceptable early-life background levels in the printed images.

In accordance with the observations leading to this invention, it was discovered that a baking process used to secure the acrylic powder caused severe decreases in the effective life of the charge roller when used in a higher speed printer. No baking is an alternative disclosed in the foregoing U.S. Pat. No. 5,637,391. By not baking the acrylic powder onto the charge roller, the life of the charge roller is increased from about 100,000–120,000 prints to around 300,000 prints when used in a combination with a charge roller wiper. This effectively solves the print quality problems associated with late-life charge rollers. Although charge rollers produced this way (unbaked) are capable of maintaining adequate charge levels (greater than 880V) throughout life, the early-life over-charging problem remains. Also, the unbaked charge roll is more sensitive to the effects of handling, which results in increased print defects resulting from disturbances in the powder coating.

DISCLOSURE OF THE INVENTION

Charge rollers of resilient organic material such as hydrin rubber or urethane rubber are immersed in 0.2–2.0 micron diameter particulate silicon carbide (SiC) and stirred or rolled until fully coated. (Only the longitudinal dimension need be coated as that is the surface which contacts a photoconductor to effect charging.) The rollers are then wiped and then blown with air to remove excess powder.

Charge rollers can also be coated by electrostatic spraying of silicon carbide powder, allowing coating automation. The excess powder is blown off with air and recycled. The amount of silicon carbide is controlled between 0.1 $mg/cm^2$ to 0.22 $mg/cm^2$ for best charging operation.

These finished rollers have a thin, even layer of loose SiC powder covering their entire outer surface. The powder can be disturbed by handling or other physical contacts, but normally no print defects result, apparently because the SiC tends to distribute charge very evenly. The charge roller is resistant to damage and charges consistently through a full life of 300,000 prints.

PREFERRED EMBODIMENTS

The charge roller prior to powder coating is the prior charge roller core before it is coated with a continuous outer layer. That roller is cylindrical, normally with a steel shaft for support and electrical conductivity, and with a central body of naturally conductive hydrin rubber or a central body of conductive ion-containing urethane rubber. Conductivity of the body may be moderately conductive or semiconductive depending on the intended application. This is termed the charge roller core. As is conventional, the longitudinal outer surface forms a nip with a photoconductive surface to effect charging.

In accordance with this invention each charge roller core is rolled in an excess supply of silicon carbide powder. Particle size of the SiC is 0.2–2.0 micron in diameter. In a specific embodiment the silicon carbide is HSC059 from Superior Graphite Co. This silicon carbide has a median particle size of 0.6 micron with 10% particles less than 0.25 micron and 90% particles less than 1.3 microns, with no particles greater than 2 microns.

Detailed Coating Procedures

Cleaning Procedure (Manual)

a) The operator wears vinyl gloves or equivalent when following these procedures.

b) Rollers go through a water wash to remove grinding debris and dust that has collected on the surface of the roller. The rollers can be air-dried, dried with an air gun, dried with a lint-free moisture-absorbing cloth, or oven-dried at up to 60° C. for 30 minutes, or another temperature and time with the approval of product engineering. Soap can be used in the wash if it does not leave a residue.

c) An alternative suitable cleaning method is to wipe a roll clean with an isopropyl alcohol (>70% by volume) pre-soaked ALPHAWIPE polyester cloth (or approved equivalent). The rolls should be air-dried for at least 1 hour before powdering.

d) With either cleaning method an adhesive tape liftoff may be used to remove any remaining contaminants from the dried rollers.

Powder-Coating Application

Manual Coating Procedure a) Operator wears vinyl gloves or equivalent when following this procedure.

b) Roller is rolled in an ample supply of the silicon carbide powder until the surface is completely covered.

c) The roller is tapped against a hard surface to remove excess powder.

d) An index finger and thumb are wrapped around the roller and moved along the roller to wipe away excess powder as often as needed.

e) Dry and filtered ionized air is blown on the roller to remove remaining free powder from the roll with particular care to handle the powdered surface as little as possible.

f) The roller is studied to assure there are no areas of the roll surface without the powder coating. Visual study through an illuminated magnifier reveals defects including lack of coating greater than 1 mm squared, uneven coating, surface contamination, and shaft contamination by excess SiC powder. If necessary, repeat the foregoing steps to completely coat the roller.

g) The powdered roll is set aside as ready for use.

Electrostatic Coating Procedure (Alternative to foregoing Manual Coating Procedure)

a) Operator wears vinyl gloves or approved equivalent when following this procedure.

b) Rollers are placed vertically in a conveyor system to transport rolls to electrostatic spray booth while rotating the roller.

c) Process speed, air pressure, and powder flow settings are adjusted so rotating rollers pass in front of the vertically oscillating spray nozzle resulting in an even powder application. A Gema MPS-1T spray unit is suitable as the spray source.

d) Excess free powder is removed from the coated rollers by passing them in front of a stationary air knife nozzle (using dry, filtered ionized air) while rotating the rolls at a high velocity.

e) Voltage applied to the roll shaft is adjusted during powdering (usually 40–50 kV, depending on environmental conditions) to achieve specified coating weight as desired. One of every 100 rollers produced during each lot is tested for coat weight by before and after weighing of the roller.

f) The powder coated rollers are removed from the continuous conveyor system after they have exited the spray booth. The rollers are studied to assure there are no areas of the roll surface without the powder coating. Visual study through an illuminated magnifier reveals defects including lack of coating greater than 1 mm squared, uneven coating, surface contamination, and shaft contamination by excess SiC powder (with particular care to handle the powdered surface as little as possible).

g) The rollers passing visual inspection arc ready for use.

The silicon carbide powder replaces acrylic powder or the nylon coating previously used. One function of this powder coating is to provide a protective layer that inhibits contaminants from adhering to the surface. This powder coating serves a second function as a barrier layer that prevents the urethane or hydrin core from degrading the photoconductor drum surface. The third function of this powder coating is to form an electrically resistive layer between the charge roller core and the photoconductor surface that prevents excessive charge and high background in toned images early in roller life.

These finished parts have a thin, even layer of loose SiC powder covering their entire outer surface. The powder can be distributed by handling or other contact, but print defects normally do not result, apparently because the SiC tends to distribute charge very evenly. As with the previous acrylic coated charge roller, during operation in an electrophotographic printer or copier paper dust and other dust coat the charge roller to provide function similar to the initial coating.

Operation of this charge roller when used in combination with a charge roll wiper, is so consistent during initial use and throughout life of 300,000 prints, that no auxiliary charging is required, thereby eliminating a brush or other charging device used with a roll charger. Observed print quality throughout life of 300,000 prints is excellent.

Alternatives of implementation will be apparent and can be anticipated.

What is claimed is:

1. A charge roller comprising a cylindrical core having a body of organic material having an outer longitudinal surface for contact charging, said cylindrical core having a predetermined electrical conductivity for contact charging, said outer longitudinal surface of said core being coated with loose particulate silicon carbide.

2. The charge roller as in claim 1 in which said silicon carbide has a particle size between 0.2 and 2.0 microns in diameter.

3. The charge roller as in claim 2 in which said organic material is urethane rubber or hydrin rubber.

4. The charge roller as in claim 2 in which said silicon carbide has a median particle size of about 0.6 micron with no particles greater than 2 microns.

5. The charge roller as in claim 1 in which said organic material is urethane rubber or hydrin rubber.

6. The charge roller as in claim 5 in which said silicon carbide has a median particle size of about 0.6 micron with no particles greater than 2 microns.

7. The charge roller as in claim 6 in which said silicon carbide has about 10% particles less than 0.25 micron and 90% particles less than 1.3 microns.

* * * * *